UNITED STATES PATENT OFFICE.

JOHN F. BENNETT, OF PITTSBURG, PENNSYLVANIA.

IMPROVEMENT IN THE MANUFACTURE OF IRON.

Specification forming part of Letters Patent No. 161,320, dated March 30, 1875; application filed January 2, 1875.

*To all whom it may concern:*

Be it known that I, JOHN F. BENNETT, of Pittsburg, in the county of Allegheny and State of Pennsylvania, have invented a new and useful Improvement in the Manufacture of Iron; and I do hereby declare the following to be a full, clear, and exact description thereof.

My invention relates to the manufacture of pig-iron, and, more especially, to such as is made from materials that, in addition to the iron ore, contain a large percentage of impurities, such as silica, alumina, sulphur, and phosphorus. By the general method of working now practiced this class of ore is smelted in the blast-furnace in the presence of large quantities of limestone and an excess of fuel, caused by the necessary excess of limestone required to remove the silica, and, as a result, high temperatures are obtained, and large amounts of carbon are present, which are both inimical to the separation of silicon from iron. In fact, experiments have proved that the amount of silicon under favorable circumstances will run as high as from eight to fifteen per cent. This silicious iron or "blazed pig" is frequently produced by accident, even in working good ore, and is commonly produced where poor material is worked. It is difficult to work to advantage, and falls far below the usual market-price of iron.

The first step of my process, based on the above, is addressed to the treatment of the ore in the blast-furnace; and it consists in treating ores of the quality specified by reducing the amount of limestone ordinarily used, employing only so much limestone or other flux as will combine with the sulphur and be sufficient to reduce to a fluid slag such impurities, exclusive of silica, as cannot be otherwise reduced, allowing the silica and alumina to pass into the crude pig as silicon and aluminum. The silicon and aluminum, which would render the iron difficult to work, and the sulphur and phosphorus, which would render it what is termed "red-short" and "cold-short," are removed by a second step of my process, which consists in submitting the crude metal while fluid to the action of a neutral flame of carbonic-acid gas for a varying time, according to the percentage of silicon present, the average being one minute for every one-tenth of one per cent. of silicon; and this is based on experiments which I have made, proving that, up to a certain point, the decrease of silicon is marked by an increase of carbon. This last fact, viz., that the decrease of silicon is marked by an increase of carbon in the iron is the basis for a third step of my process, or, perhaps, what may be considered but as a continuation of the second step, viz.: Commencing with a pig metal containing a large per cent. of silicon, I subject it to the neutral carbonic-acid flame until the minimum of silicon remains, when the maximum of carbon will be present, whereby I obtain a carbide of iron which will melt at low temperatures, and is useful in the arts.

I will now give a specific illustration of my invention, so as to enable others skilled in the art to use the same, and for that purpose will describe the process as conducted with the protoxide ores obtained in Michigan, known as "Lake Superior ores," and which contain silica crystallized under the name of quartz, jasper, &c., in about the following proportions: Iron, 71 parts; oxygen, 27 parts; silicate alumina, 2.3 parts; iron, 46 parts; oxygen, 13 parts; silicate alumina, 2 parts; quartz or jasper, 39 parts.

Heretofore in working the blast-furnace with the first-mentioned ore twenty-five per cent. of limestone to every one hundred of ore is sufficient to obtain a liquid slag. The second, containing thirty-nine per cent. of quartz and jasper admixture, has been rejected, because it often required as high as one hundred and fifty per cent. of limestone to the one hundred of ore, and a proportionately large quantity of fuel. The intermediate grades of ore required limestone in proportion.

I proceed as follows: No matter how high the percentage of silica in the ore, I only add sufficient limestone to combine with the sulphur and other impurities, exclusive of silica, generally about twenty per cent. to the one hundred of ore, seldom exceeding the twenty-five per cent. commonly employed for the better class of ores and the usual amount of fuel, reducing the ore so as to allow the silica and alumina to be reduced into the metallic state, and to pass with the crude pig metal from the blast-furnace in the metallic state.

This metal containing the silicon and aluminum I tap from the blast-furnace into a reverberatory or other suitable furnace previously heated either by the waste gases from the blast-furnace, or in other well-known manner, until the impure liquid metal covers the hearth to a depth of three or more inches. I then cause a neutral flame of carbonic-acid gas to play or pass over the impure silicon pig for a length of time equal to about one minute for every tenth of one per cent. of silicon contained in the metal, the amount of silicon having been previously determined by the well-known tests. For instance, a metal containing carbon 3.32 and silicon 3.72 would be affected about as follows, other things being equal: At the end of thirty minutes, 3.66 carbon, 1.60 silicon; at the end of forty minutes, 3.78 carbon, .798 silicon; at the end of fifty minutes, 3.56 carbon, .056 silicon—the latter indicating a point at which the flame is decarbonizing the iron, the silicon having been removed.

The elimination of the silicon may be accurately ascertained by the use of the spectroscope, and will be completed when the jets of flame or "candles" issuing from the liquid mass cease to be those of burning silicon, and become those of burning carbonic oxide. In a short time the workman will become so well acquainted with the phenomena that he will distinguish the changes from looking at the surface of the liquid metal through a piece of blue or colored glass.

If the amount of silicon in the crude pig has been large, the result of the above treatment will be a pig metal having a large per cent. of carbon in combination, tests having shown that the amount of carbon deposited is about equal to one-fifth of the silicon removed—that is to say, if the impure pig metal, when placed melted in the reverberatory furnace, consists of carbon, three per cent., silicon, five per cent., and iron, ninety-two per cent., it will, after the flame has operated upon it for fifty minutes, contain four per cent. of carbon, ninety-six per cent. of iron, and traces of silicon, or rather silicic acid, mechanically mixed with the pig metal, and which will separate therefrom as a cinder if the metal is slowly cooled.

When I desire to obtain an easily-fusible pig metal, or one containing a large per cent. of carbon, I proceed according to the third step of my process, as follows: I make use of iron ores that contain or are commixed with large quantities of silica, such as quartz and jasper, and, if necessary for my purpose, add to the iron ore silica, (quartz,) for the purpose of first producing an impure pig metal containing fifty per cent. of silicon, more or less. This impure pig metal I treat as described—that is, by causing a neutral flame of carbonic-acid gas to play over it while in a liquid condition for a time equal to one minute for every tenth of one per cent. of silicon present, which in a pig containing fifty per cent. of silicon would result in a product containing ten per cent. of carbon. Of course, if this step of the process is commenced with a pig containing a higher per cent. of silicon, a higher carbide will be obtained, and by selecting a metal containing the proper amount of silicon to commence with a carbide of any desired grade may be obtained.

I find, in practice, that while silicon is being removed a portion of the sulphur and phosphorus contained in the impure pig metal is also eliminated.

I have described the several steps as a continuous operation, but it is evident that each step may be separately conducted on the materials specified, and with the result set forth.

The saving in fuel and limestone, and in the wear and tear of the furnace, may be enumerated as among the advantages of my improved process.

Having thus described my invention, what I claim, and desire to secure by Letters Patent, is—

1. The process herein described, for manufacturing iron, consisting in first reducing the ore in a blast or similar furnace with the minimum amount of flux, so as to obtain a silicon iron, and then subjecting the impure pig metal to a neutral flame of carbonic-acid gas for the removal of the silicon.

2. The process herein described for obtaining a pig metal containing a high percentage of carbon, consisting in first adding silica, such as quartz or jasper, to the iron ores, and reducing the admixture, so as to obtain an impure pig containing the desired amount of silicon, and then submitting the impure pig metal to a neutral flame of carbonic-acid gas, so as to eliminate silicon and deposit carbon.

In testimony whereof I, the said JOHN F. BENNETT, have hereunto set my hand.

JOHN F. BENNETT.

Witnesses:
F. W. RITTER, Jr.,
T. B. KERR.